April 5, 1927.
W. M. REASON
1,623,319
AUTOMOBILE TRANSMISSION LOCK
Filed Aug. 14, 1922
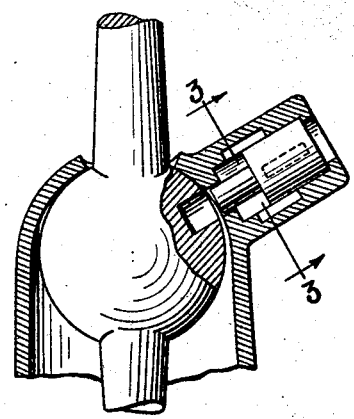
Fig. 2.
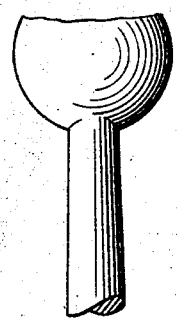
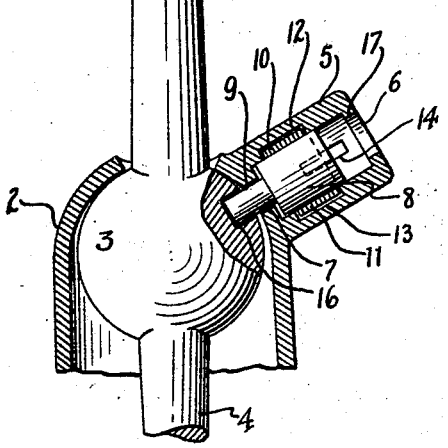
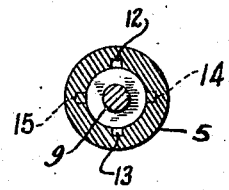
Fig. 3.
Fig. 1.
Inventor
Walter M. Reason.
By
Attorney Patented Apr. 5, 1927.

1,623,319

UNITED STATES PATENT OFFICE.

WALTER M. REASON, OF PONTIAC, MICHIGAN, ASSIGNOR TO ELIZABETH BALLAMOS, OF PONTIAC, MICHIGAN.

AUTOMOBILE TRANSMISSION LOCK.

Application filed August 14, 1922. Serial No. 581,601.

This invention relates to locks for shift levers of power transmission mechanism the object being to provide a simple and efficient locking device for maintaining the shift lever of an automobile power transmission set in its neutral position. The feature of the invention is in the provision of a member that is slidable by means of the key and locked in either of two positions—that is the barrel in which the key is insertible is moved longitudinally to the locking position and is locked in such a position and is unlocked and moved to unlocked position and is locked in the said unlocked position. A further object is to secure a very simple and inexpensive locking structure for this purpose these objects and several novel features of the invention are hereinafter more fully described and explained and the preferred form of construction of a locking device embodying my invention is shown in the accompanying drawings in which—

Fig. 1 is an elevation partly in section showing my improved locking structure in locked position.

Fig. 2 is a similar view showing the unlocked position.

Fig. 3 is a section taken on line 3—3 of Fig. 2.

In the usual power transmission set for automotive vehicles there is ordinarily employed a shift lever such as is here indicated at 1 which is pivotally mounted in the case, a portion which is indicated 2. Usually the shift lever is provided with a ball portion 3 although often times a different structure is utilized as for instance a spherical shaped member having the same general function as the ball here shown as is well understood by those familiar with art. The shift lever is rocked forward or back from the position shown in Fig. 1 to bring the lower shift arm 4 to position to engage one or the other of shift gears or forks therefor not here shown and then the lever 1 is moved to the right or left to shift the gear from its neutral position. However the position of the lever shown in Fig. 1 as is well known, the driving gears of the transmission are out of commission and inoperative. My object is to provide a locking means to prevent shifting of the lever from its neutral position and for this purpose I have provided at a convenient point on the transmission case 2 and directly to the rear of the lever 1 an outward projecting hollow member 5, having a front cylindrical aperture 6 and an aperture 7 at the bottom thereof opening into the interior of the case to engage the ball or other member as the case may be movable with the lever 1. In the interior of the hollow member 5 is provided the locking device which consists of a barrel and the lock bolt 9. The barrel is of usual well known type into the outer end of which the key is insertable and by rotation of the key the lock pins 10 and 11 on opposite sides (which normally project outward from the surface of barrel 8) may be drawn in practically flush with the surface which will permit the barrel to be rotated in the shell 5. This shell is provided with a series of notches 12 and 13 at one point and on diametrically opposite sides of the shell and similar notches 14 and 15 at a right angle thereto and on diametrically opposite sides of the shell as will be understood from Figs. 1 and 3. The notches 14 and 15 are in staggered relation with the notches 11 and 13 being more distant from the bolt aperture than the latter notches and it will be observed that by insertion of the key and rotation thereof in its barrel 8 the pins 10 and 11 are drawn in to the surface of the barrel and then the barrel may be rotated by the key one-fourth of a turn and the barrel withdrawn and moved outwardly from the position shown in Fig. 1 until the pins 10 and 11 therein register with the notches 14 and 15. At this point the key may be turned to release the pins which will project in the notches 14 and 15 and hold the barrel in locked position.

In the position shown in Fig. 1, the barrel 8 is at its lowermost point and the bolt 9, which is secured to the barrel 8, projects through the aperture 7 into a recess 16 in the ball 3 or other portion of the shift lever which, when the lever is in neutral position, is in alignment or registration with the aperture 7. With the bolt in position shown in Fig. 1 the shift lever is held from movement in any direction as movement tends to shear the bolt. Therefore, although the bolt is small and the parts are cheaply constructed yet the bolt 9 being of hardened steel it withstands any force that can be applied thereto by the lever.

The barrel of the lock as here shown is of well known form and in general public use and therefor further details and description of operation of the pins and interior structure of the lock is unnecessary. The new feature involved in this lock is in the longitudinal movement of a barrel and the lock bolt in the chamber of the member 5. The member 5 may be peaned over at the end as indicated at 17 to prevent removal of the lock from its case. The position of the lock as heretofore stated is directly to the rear of the shift lever as will be readily understood in most convenient position for operation by the driver of the vehicle and to lock or unlock the device merely requires the key being inserted and turned to withdraw the pins 10 and 11 whereupon it may be moved to project or withdraw the bolt 9 to or from engagement within the ball recess and then turned to align the pins with the desired recesses in the shell 5 whereupon the barrel and bolt are locked in position in the shell. This is necessary whether the shift lever is locked or unlocked and prevents the bolt from accidently sliding to the locked position when the car is in use or from being moved from locked position when the car is not in use.

Having described my invention what I claim and desire to secure by Letters Patent of the United States is—

1. A locking device for shift levers comprising the combination with a lever having a ball like portion and a supporting casing therefor of hollow form, the said casing being half ball like at the upper end of a diameter somewhat greater than the diameter of the ball and in which the ball seats, the said upper end of the casing having an aperture through which the lever projects of a form and diameter to permit rocking of the lever in any direction, a boss integrally formed with the casing and lying at an angle to the vertical axis thereof, the said boss having a central chamber and an opening in the bottom thereof to the interior of the casing, the said ball also having a recess adapted to be brought to registration with the said last named opening when the lever is in neutral position, a lock member having a portion adapted to be projected into the ball recess by movement of the lock longitudinally in the boss, the inner wall of the boss having two pairs of notches in staggered relation, the said pairs being on diametrically opposite sides of the inner wall, the said lock member being rotatable in the boss, and retractable plungers for engaging the respective pairs of notches in the wall of the boss to maintain the lock member in a locked or unlocked position.

2. A locking device for shift levers comprising the combination with a lever having a ball like portion and a hollow supporting case therefor in the upper end of which the ball seats and which is provided with an aperture thru which the lever projects, the aperture being of a form to permit the rocking of the lever in any direction, and a boss integrally formed with the casing and lying at an angle to the vertical axis thereof, the said boss having a central chamber and an opening in the bottom thereof to the interior of the casing, the said ball also having a recess adapted to be brought to registration with the said last named opening when the lever is in neutral position, of a lock member having a portion adapted to be projected into the ball recess by movement of the lock longitudinally in the boss. the inner wall of the boss having two pairs of notches in staggered relation, the said pairs being on diametrically opposite sides of the inner wall, the said lock member being rotatable in the boss, and retractable plungers for engaging the respective pairs of notches in the wall of the boss to maintain the lock member in a locked or unlocked position.

In testimony whereof, I sign this specification.

WALTER M. REASON.